(12) United States Patent
Butcher

(10) Patent No.: US 6,684,597 B1
(45) Date of Patent: Feb. 3, 2004

(54) EDGING STRIP

(75) Inventor: Rob Butcher, Derbyshire (GB)

(73) Assignee: Newell Limited, Tyne and Wear (GB)

(*) Notice: Subject to any disclaimer, the term of this patent is extended or adjusted under 35 U.S.C. 154(b) by 0 days.

(21) Appl. No.: 10/049,775

(22) PCT Filed: Aug. 16, 2000

(86) PCT No.: PCT/GB00/03185
§ 371 (c)(1),
(2), (4) Date: Feb. 19, 2002

(87) PCT Pub. No.: WO01/14662
PCT Pub. Date: Mar. 1, 2001

(30) Foreign Application Priority Data

Aug. 20, 1999 (GB) ............................................. 9919824
Oct. 11, 1999 (GB) ............................................. 9924024

(51) Int. Cl.[7] .................................................. E04F 19/06
(52) U.S. Cl. ....................... 52/745.19; 52/98; 52/287.1; 52/717.05
(58) Field of Search ........................... 52/98, 102, 254, 52/179, 366, 800.1, 800.11, 800.12, 717.04, 717.05, 287.1, 396.1, 745.19; D25/119, 124, 125, 136

(56) References Cited

U.S. PATENT DOCUMENTS

| | | | | |
|---|---|---|---|---|
| 3,514,914 A | * | 6/1970 | Bergquist | |
| 3,605,356 A | * | 9/1971 | Bordner | |
| 3,922,824 A | * | 12/1975 | Izawa et al. | ................... 52/94 |
| 4,054,698 A | * | 10/1977 | Hamrah | ...................... 428/40 |
| 4,188,432 A | | 2/1980 | Holden et al. | |
| 4,289,818 A | | 9/1981 | Casamayor | |
| 5,031,376 A | * | 7/1991 | Bender et al. | ................. 52/609 |
| 5,073,430 A | * | 12/1991 | Aiden | .......................... 428/43 |
| 5,144,778 A | * | 9/1992 | Pourtau et al. | ............... 52/254 |
| 5,289,663 A | * | 3/1994 | Schuliiter | .................. 52/287.1 |
| 5,333,432 A | * | 8/1994 | Schuliiter | .................. 52/396.1 |
| D363,788 S | * | 10/1995 | Caley | ......................... D25/119 |
| 5,461,836 A | * | 10/1995 | Yang | ............................ 52/179 |
| D364,233 S | * | 11/1995 | Caley | ......................... D25/119 |
| D364,234 S | * | 11/1995 | Caley | ......................... D25/119 |
| D368,969 S | * | 4/1996 | Davies | ....................... D25/119 |

FOREIGN PATENT DOCUMENTS

DE 3601861 7/1987
GB 2232176 12/1990

* cited by examiner

Primary Examiner—Robert Canfield
(74) Attorney, Agent, or Firm—Volpe and Koenig, P.C.

(57) ABSTRACT

An elongate edging strip for trimming the edges of building panels such as tiles comprises an extruded profile made from a vinylaromatic homopolymer or copolymer. The profile comprises a leg section (1), intended to locate under the building panel and an upstanding section (2), both of solid material. The upstanding section (2) is turned inwards to form a groove containing a fillet (7) of foamed material. In an alternative aspect, a method of making an elongate edging strip is described, said method comprising extruding a profile comprising a base section and two spaced upstanding sections, forming a longitudinal line of weakness in the base section, and breaking the profile apart at said line of weakness to form two edging strips.

9 Claims, 2 Drawing Sheets

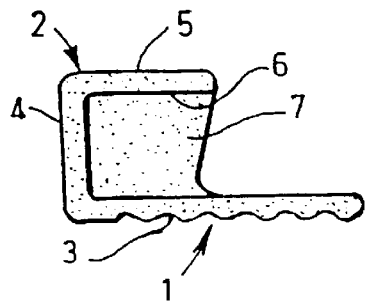
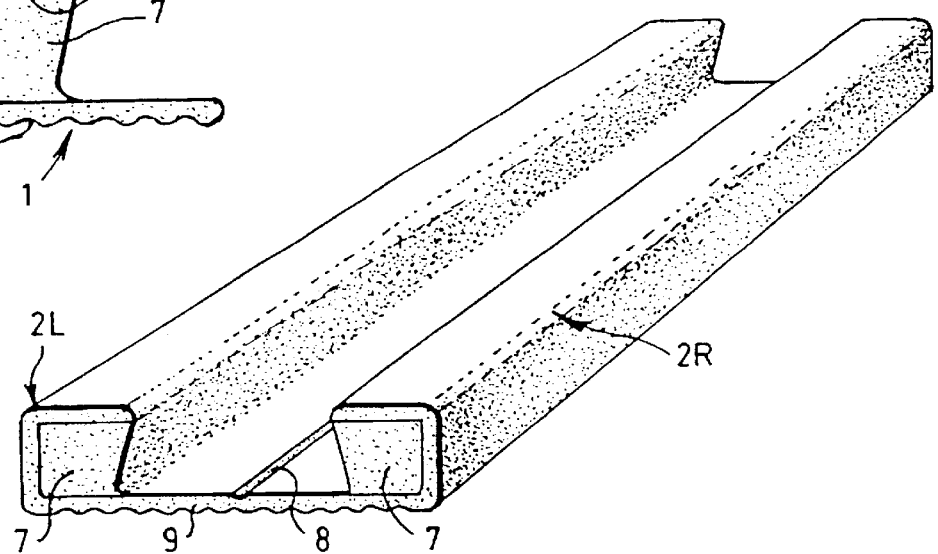
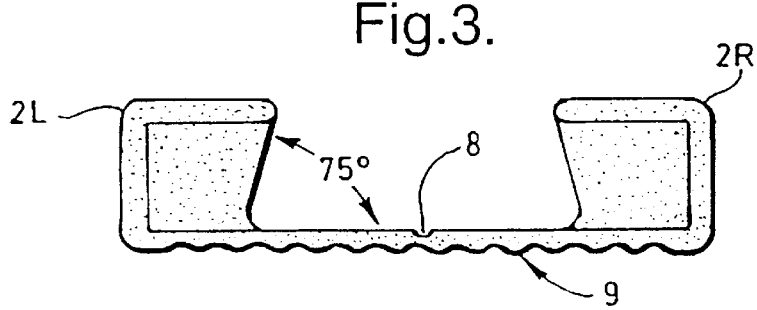
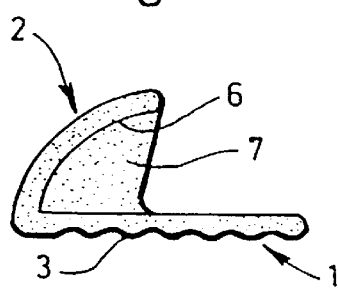
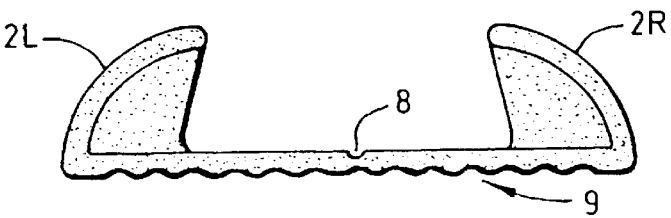

EDGING STRIP

This invention relates to an elongate edging strip for trimming the edges of panels, such as tiles, used in building work.

Such products are known and generally comprise, in profile, a leg section which extends under the tiles and is embedded in a tile adhesive, and an upstanding section which is of a height such that its top edge lies approximately on the same plane as the outer surface of the tiles, and therefore acts to protect the vulnerable edges of the tiles from being chipped. The outward facing surface of the strip is preferably a decorative surface and may be curved or provided with some other decorative shape to provide an aesthetically pleasing edge to the tiles, or may simply be painted in an attractive colour, or provided with a decorative printed or embossed finish.

Existing products are generally fabricated as an elongate extrusion of plastics material such as polyethylene or polypropylene.

The present invention seeks to provide an improved edging strip.

In accordance with a first aspect of the invention there is provided an elongate edging strip made out of an extruded material, characterised in that the material is a vinylaromatic homopolymer or copolymer. Examples of such materials include styrene based materials, such as polystyrene, polystyrene alloy or ABS (acrylonitrile butadiene styrene).

Vinylaromatic materials have a number of advantages over the currently used materials. For example, polystyrene is considered to be more environmentally friendly than the current most commonly-used material, which is PVCu. Also the surface of polystyrene is such as to exhibit, improved performance when used with adhesive, particularly ceramic tile adhesive. This in turn has enabled a simpler construction to be used, with a reduced need for special formations or apertures to be formed on the leg section of the profile. For example most current PVCu edging strips rely on the adhesive being squeezed through holes which are punched at intervals during manufacture along the length of the leg section. The formation of these holes requires an extra manufacturing step and increases the cost of the product. Using polystyrene, we have found that there is no need for these holes and, indeed, the length of the leg section, in profile, can be shortened, thus saving material costs.

Due to its relatively high surface energy and chemical structure, polystyrene readily accepts a number of decorative finishes, so that the front surface of the upstanding section of the profile can be given a desired decorative effect. For example, polystyrene readily accepts paints and hot stamp decorative foils to achieve levels of gloss sufficient to emulate glazed ceramic.

By contrast, polyethylene and polypropylene materials have a naturally oily surface and PVCu compounds have lubricant added during their manufacture. These materials do not have an "instant grab" to ceramic tile adhesive and they often require pre-treatment prior to paint finishing due to their low surface energy.

In a preferred embodiment the edging strip comprises a skin made of solid material and a core made of foamed material. For example, the strip may be co-extruded with a solid styrene skin and a foamed styrene core.

In accordance with a second aspect of the invention there is provided a method of making an elongate edging strip comprising, in profile, a leg section and an upstanding section, said method comprising forming by extrusion an elongate profile comprising a base section and two spaced upstanding sections, said base section being formed with a longitudinal line of weakness extending between said upstanding sections, and thence breaking the profile apart along the line of weakness to form a pair of said edging strips. The two edging strips formed in this way would normally be identical, but they do not have to be so. Any decorative finish to be applied to the upstanding portions can be applied either before or after breaking the profile.

The edging strip may be made of any suitable material, but is preferably made from a vinylaromatic homopolymer or copolymer, such as polystyrene, in the manner described above.

In order that the invention may be better understood, an embodiment thereof will now be described by way of example only and with reference to the accompanying drawings in which:

FIG. 1 is a cross sectional view of a first embodiment of an edging strip according to the invention;

FIGS. 2 and 3 are perspective and cross sectional views respectively of a pair of joined strips of the type shown in FIG. 1, as seen during manufacture;

Figure 6:
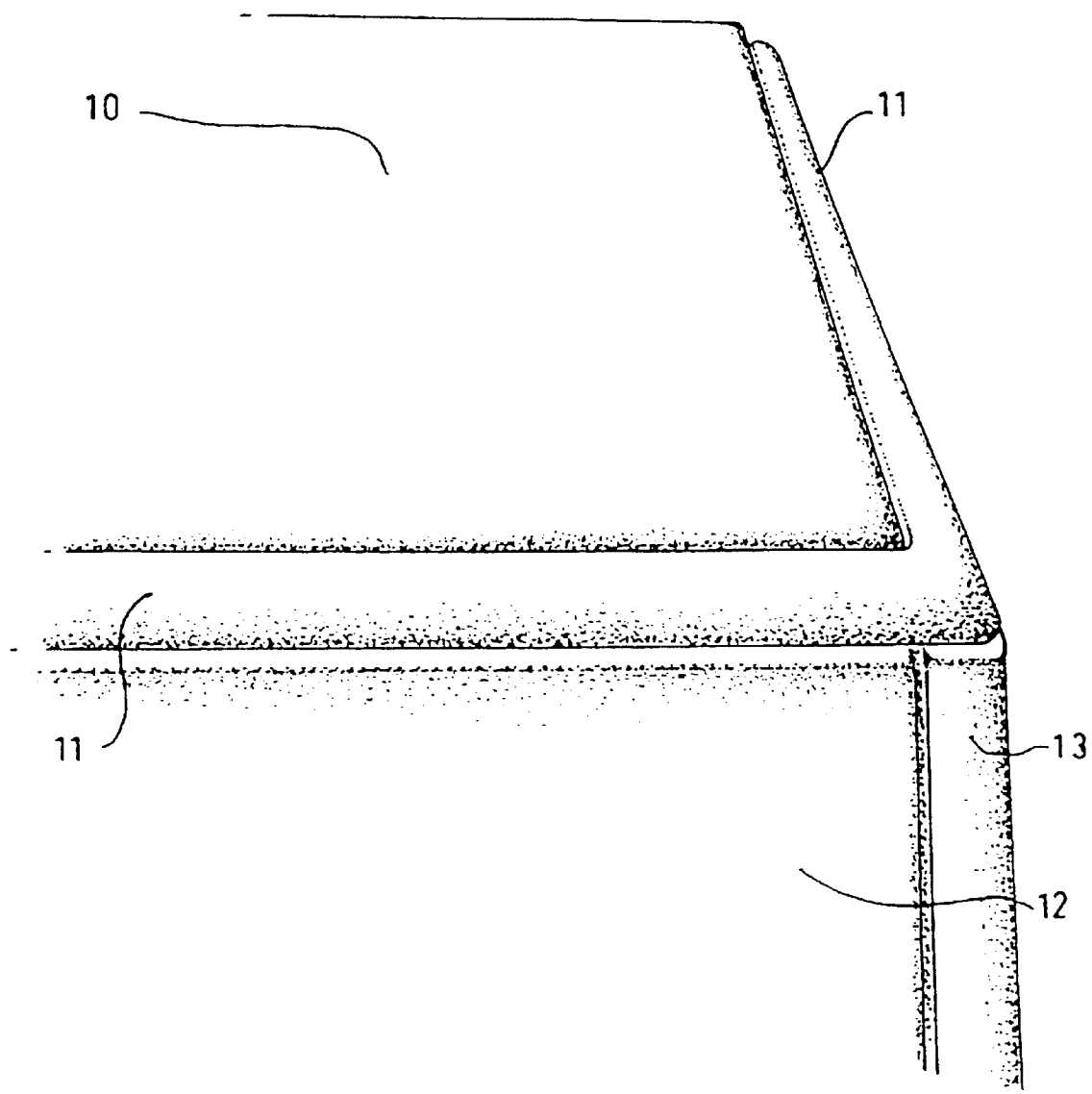

FIGS. 4 and 5 correspond to FIGS. 1 and 3 respectively, showing a second embodiment; and FIG. 6 is a perspective view from above of a three-way corner showing the advantage of using square-edge trim.

Referring to FIG. 1, the edging strip illustrated is intended to edge ceramic tiles. The strip is elongate and of indefinite length, being cut to length with a small saw during fitting. FIG. 1 thus shows the strip in profile, and comprises a leg section 1 and an upstanding section 2. The undersurface 3 of the leg section 1 is formed with longitudinally-extending serrations which improve the grip of the tile adhesive, when fitted.

The upstanding section 2 can take various forms, according to the desired finish to be obtained—it will be appreciated that, once fitted, only the upstanding section 2, indeed only its outer surface, will be visible. The particular shape shown is an angular shape, with an upright portion 4 and a top portion 5 which is substantially at right angles to the upright portion 4. However, other shapes, such as a gradually curved shape can be used for the upstanding section, according to the particular requirements.

The upstanding section 2 is such as to form with the leg section 1 an inturned section forming a groove 6. The strip is made of two grades of plastic material: a solid plastics material is used for the leg section and upright section and a lower-density (e.g. foamed) plastics material is used to fill the groove 6 to form a fillet 7. In the preferred embodiment of the invention, both plastics materials take the form of a vinylaromatic homopolymer or copolymer, in particular styrene-based materials such as polystyrene or ABS. The strip is preferably formed by co-extrusion of solid and foamed material to form the leg/upstanding sections 1/2 and fillet 7 respectively.

The manner in which such edging strips are used is well known and will not be described in detail. Briefly, the strip is intended to lie along the edge of a panel of ceramic or similar tiles. The strip is fitted during installation of the tiles by seating it on tile adhesive and overlaying the first row of tiles (not shown) over that part of the leg section 1 which protrudes beyond the upstanding section 2. In this way, the leg section 1 is firmly embedded in the tile adhesive and located underneath the edge of the first row of tiles. The height of the upstanding section 2, particularly its upright portion 4, will be set so that the top surface of the top portion 5 is approximately co-planar with the tile surface, or possibly a little below it. The outer surface of the upright portion 4 and the top portion 5 can be provided with a desired decorative finish to enhance the normally unsightly raw edges of the tiles.

Holes can be punched out of the leg section 1 at spaced intervals along its length in order to enhance the grip of the adhesive on the strip. However, if use is made of, for example, polystyrene, it is found that such holes are not necessary to securely attach the strip and, indeed the length of the leg section 1, when seen in FIG. 1, can be reduced over the equivalent profile when made from conventional materials such as PVCu. Typically the length of the leg section 1 is in the range 18 to 22 mm. For example, to cater for the two most common wall tile thicknesses, typical sizes might be:

1) Height of upright portion 4: 11.2 mm
   Length of leg section 1: 21.2 mm
2) Height of upright portion 4: 8 mm
   Length of leg section 1: 18 mm FIGS. 2 and 3 illustrate a method of manufacturing the profile of FIG. 1 although the same technique could be used for other profiles. The method involves co-extruding the profile illustrated in FIG. 3 with a line 8 of weakness formed in the top surface of the base section 9 and extending centrally between the left and right upstanding sections 2L and 2R. In order to form the profile of FIG. 1, the profile of FIGS. 2/3 is broken along the line 8 of weakness to form two identical strips of the profile shown in FIG. 1.

Referring to FIGS. 4 and 5 there are shown views corresponding to FIGS. 1 and 3 respectively of a second embodiment of the invention. This embodiment differs from the first only in that the upstanding section 2 has a rounded shape.

In the embodiments shown, the profile is symmetrical about a vertical central plane passing through the line 8 of weakness; however the profile does not have to be symmetrical but, if it is not, the profiles produced after splitting will not be identical.

The use of square edge trim as shown in FIGS. 1 to 3, whilst not essential, has an advantage when used in three-way corners, such as of the type illustrated in FIG. 6. FIG. 6 shows a horizontal tiled shelf 10 which is trimmed with horizontal edging strips 11 having a round upstanding section. The horizontal sides of the shelf, only one of which is visible under reference 12, are also assumed to be tiled, and the vertical corner so formed is finished with an edging strip 13 of the type illustrated in FIG. 1—in other words, having a squared upstanding section. The advantage of using the squared edging will be apparent from FIG. 6: the joint can be fully grouted in. If round edging strip is used for the vertical corner, the mitre joint formed between the horizontal edging strips 11 overhangs the vertical edging strip 13 in the extreme tip of the corner, which is not only unsightly, but is also vulnerable to damage.

What is claimed is:

1. A method of making an elongate edging strip comprising, in profile, a leg section and an upstanding section, said method comprising forming by extrusion an elongate profile comprising a base section and two spaced upstanding sections, said base section being formed with a longitudinal line of weakness extending between said upstanding sections, and breaking the profile apart along the line of weakness to form a pair of said edging strips.

2. A method according to claim 1, wherein said extruded elongate profile is of a material selected from vinylaromatic homopolymers and vinylaromatic copolymers.

3. A method according to claim 2, wherein the material is styrene based.

4. A method according to claim 3, wherein the material is one of the group comprising polystyrene, polystyrene alloy and acrylonitrile butadiene styrene (ABS).

5. A method according to claim 1, wherein said base defines, with each said upstanding section, a groove which is filled with a fillet.

6. A method according to claim 5 wherein the fillets are co-extruded with the profile.

7. A method according to claim 5 wherein the fillets are formed of a foamed synthetic resin material.

8. A method according to claim 1, wherein the upstanding section is extruded in a shape that presents to the exterior a substantially planar front surface and a substantially planar top surface.

9. A method according to claim 1, wherein the upstanding section is extruded in a shape that presents to the exterior a curved surface.

* * * * *